Dec. 13, 1966     C. B. A. WICKENHAGEN     3,292,076
VARIABLE VOLTAGE CONTROL SYSTEM
Filed Jan. 14, 1963                 2 Sheets-Sheet 2

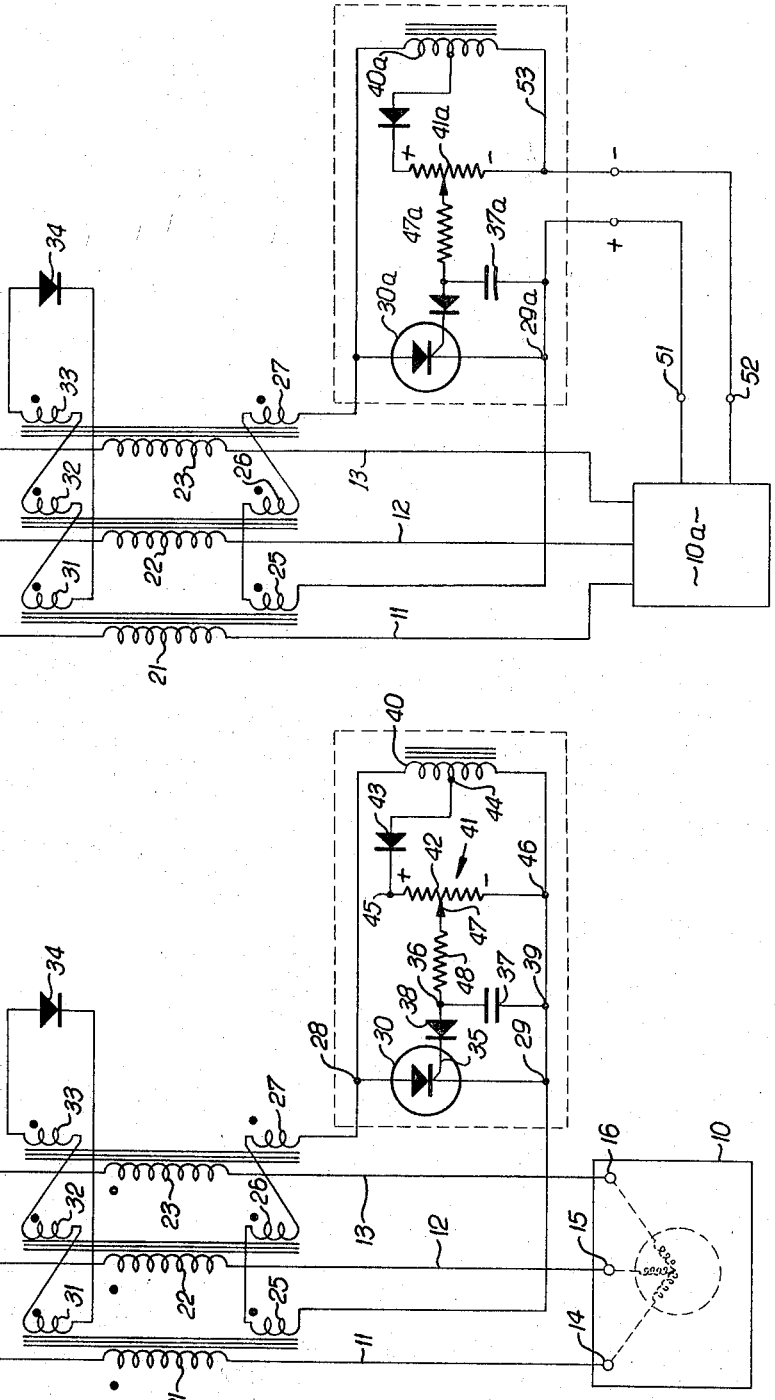

INVENTOR.
*Cornelis B. A. Wickenhagen*
BY
*Flam and Flam*
*Attorneys.*

United States Patent Office 3,292,076
Patented Dec. 13, 1966

3,292,076
VARIABLE VOLTAGE CONTROL SYSTEM
Cornelis B. A. Wickenhagen, Torrance, Calif., assignor to Emerson Electric Co., a corporation of Missouri
Filed Jan. 14, 1963, Ser. No. 251,178
9 Claims. (Cl. 323—89)

This invention relates to a multiphase voltage control system. Particularly this invention relates to a system of this character in which a reactor serially associated with the load has a core which is adjustably saturated. Such variable reactors are now well-known; the saturation may be provided by a winding supplied with an adjusted direct or pulsating current.

For controlling a three phase system in this manner, it has been proposed to use three separate control circuits. Such a control system is more than three times as complicated as a single phase control system. To obtain any degree of balance among the phases, exceptional uniformity of components is required, at corresponding expense.

The primary object of this invention is to provide a single circuit for a three phase control system of this character that avoids this multiplication of elements.

Another object of this invention is to provide a single phase circuit for correspondingly controlling the voltage in each of the phases of a three phase system.

To accomplish the foregoing objectives, a transformer in each phase is provided having its primary windings serially associated with the power circuit and its secondary windings serially connected together across a control circuit and in such manner that the voltages do not balance out. The control circuit simultaneously short circuits the secondary windings for a fraction of the cycle of the source. A heavy saturating current is circulated and the effective impedance of each of the primaries is correspondingly controlled.

The use of a common control circuit for the several phases is made possible by using a balancing circuit that largely corrects for the imbalances due to single phase operation of the control circuit. The balancing circuit in one form of the invention comprises a set of tertiary windings for the transformers serially connected together in a unidirectionally conductive short circuit loop so that their outputs are normally balanced. The unbalanced outputs result in conduction and transfer of energy among the several phases to correct for unbalance.

In another form of this invention, the balancing circuit operates as an adjunct to the control circuit.

Another object of this invention is to provide a control circuit of this description in which the effects of heavy load current in opposing saturation effects are overcome by providing a full wave transformer circuit structure. Thus oppositely polarized sections for each phase ensure that the magnetization due to load current assists the magnetization effects due to control current. Thus at least one of the sections provides a low impedance path for load current.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a schematic diagram showing one form of the present invention;

FIG. 3 is a schematic diagram similar to FIG. 1, but illustrating the use of a control circuit for regulating purposes.

Figure 4:
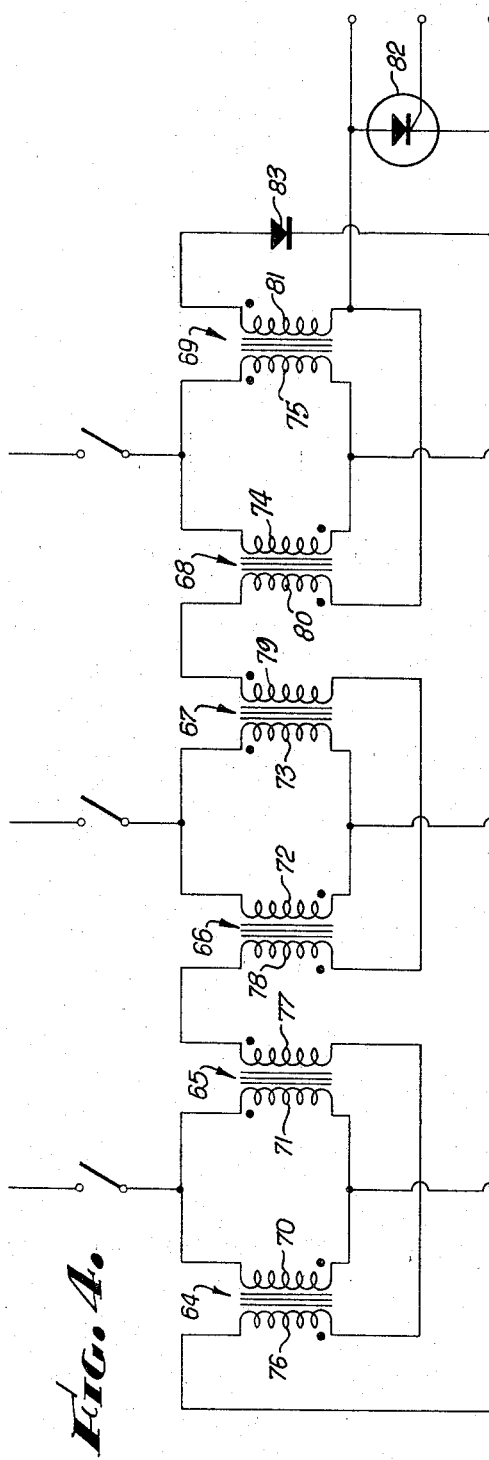
FIG. 4 is a schematic diagram similar to FIG. 1, but illustrating a modified form of the present invention.

In FIG. 1 there is illustrated a three phase load 10 that is adapted to be energized from three phase supply terminals $T_1$, $T_2$ and $T_3$. The load 10 may be an induction motor, a three phase rectifier with D.C. load, or any other device. Leads 11, 12 and 13 are adapted to connect terminals 14, 15 and 16 of the load 10 to the source terminals $T_1$, $T_2$ and $T_3$. A power switch 17 has elements 18, 19 and 20 respectively interposed in the leads 11, 12 and 13.

Serially inserted in the leads 11, 12 and 13 are primary windings 21, 22 and 23 of three iron core saturable reactors or transformers. Secondary windings 25, 26 and 27 are respectively coupled to the primary windings 21, 22 and 23. The secondary windings carry direct current for magnetizing the corresponding cores by controlled amounts, thereby correspondingly altering the impedance of the primaries.

Figure 2:
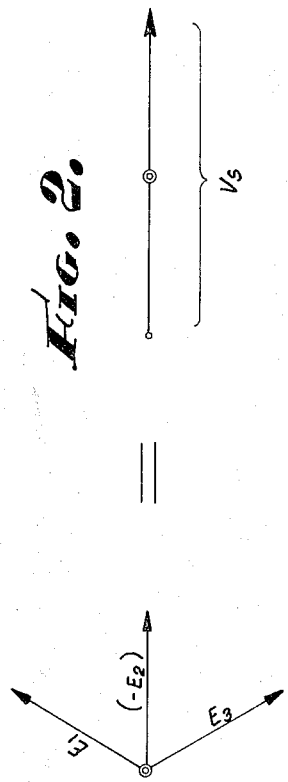
FIG. 2 is a vector diagram showing voltages in the control circuit.

These secondary windings 25, 26 and 27 are serially connected together for passage of a common magnetizing current through them. In order to drive this magnetizing current through the windings, use is made of the voltage induced in the secondary windings. This may be accomplished by connecting one of the windings 25 in opposite phase. In FIG. 2 there is a graph showing the voltage $V_s$ derived at terminals 28 and 29.

A silicon controlled rectifier (SCR) 30 connects the terminals 28 and 29. The SCR 30 is switched on at a selected phase angle in the positive half of the cycle of the source voltage corresponding to vector $V_s$ of FIG. 2. When the SCR 30 is switched on, it circulates a heavy current throughout the remainder of the positive half cycle. A net magnetization of the cores of all of the transformer winding results.

Neglecting phase distortion, then the periodic magnetization reduces the average impedance of the several sections, and the desired control is achieved.

Since the magnetization produced by the control circuit operates over different portions of the cycles of the respective phases, the effect on the several phases may not be identical. In order to minimize phase distortion and in order to commutate field energy due to the lagging magnetizing current at the instant the SCR 30 turns off, tertiary windings 31, 32 and 33 are provided.

These tertiary windings are magnetically coupled to the primary windings 21, 22 and 23 respectively. These tertiary windings are serially connected together so as to produce no net voltage under balanced conditions. However, should unbalance occur, a net A.C. voltage is produced, and current is circulated. In order to obtain a net average magnetization upon circulation of current due to unbalanced conditions, and thereby a corrective effect, a diode 34 is inserted in the series circuit of tertiary windings 31, 32, 33.

The tertiary windings and the diode 34 are so polarized relative to the secondary windings that they sustain current adequate to prevent immediate collapse of the magnetic field as the SCR 30 turns off. Hence the magnetization due to conduction through SCR 30 decays but carries over for the succeeding cycle of operation of the SCR. By adjusting the phase angle of firing the SCR 30 the average saturation and hence impedance is adjusted.

The SCR 30 has its anode connected to the terminal 28 and its cathode connected to the terminal 29. The SCR has a gate 35 connected to one terminal 36 of a small condenser 37 via a blocking diode 38. The other terminal 39 of the condenser 37 is connected to the cathode of the SCR 30 and the terminal 29. As a positive charge is slowly built up on the condenser 37, as hereinafter explained, a voltage is ultimately reached that is adequate to send triggering gate current to the SCR 30.

The voltage applied to the SCR by terminals 28 and 29 is also used to build up charge on the condenser 37 in a manner presently to be described. As the anode voltage of the SCR 30 builds up from zero, so also the charge on the condenser 37 is built up. The rate at which charge builds up on the condenser 37 determines the time in the cycle of the source at which firing occurs. Accordingly, the average saturation effect produced by the SCR conduction is controlled.

The charging circuit for the condenser 37 includes a reactor coil 40, connected across the supply terminals 28 and 29, and a potentiometer 41. The potentiometer 41 has a resistor 42 that is connected across a section of the reactor coil 40. For this purpose, a diode 43 connects a tap 44 of the coil 40 to one terminal 45 of the potentiometer resistor 42. The other terminal 46 of the resistor 42 is connected to the terminal 29. A slider 47 engages the potentiometer resistor 42 and is connected via a small resistor 48 to the condenser terminal 36. As the source voltage across terminals 28 and 29 builds up from zero, the condenser 37 is charged via diode 43, a portion of the potentiometer resistor 42, and the resistor 48. The rate of charge depends upon the position of the slider 47.

At the instant of firing of the SCR, the coil 40 is short-circuited just as are the secondary windings 25, 26 and 27. The source for charging the condenser 37 accordingly collapses, and the condenser 37 discharges through the various paths provided. When the SCR 30 turns off and the source across terminals 28 and 29 swing negative, the diode 43 prevents the imposition of any negative charge on the condenser 37. Accordingly, the condenser 37 approaches zero at the start of the succeeding half-cycle, and the cycle is repeated. Due to the fact that the source voltage for the gate 35 collapses immediately upon conduction of the SCR, the gate of the SCR is protected by the inherent nature of the circuit.

The diode 38 prevents reverse gate current, and the resistor 48 limits gate current to a tolerable value.

In the form of the invention illustrated in FIG. 3, the load 10a is operated by a circuit similar to that shown in FIG. 1. A sensing circuit associated with the load 10a provides a signal voltage at terminals 51 and 52 that is inserted into the control circuit for the SCR 30a. The signal voltage at terminals 51 and 52 is inserted in the lead 53 between the negative side of the condenser 37a and the terminal 29a, on the one hand, and the negative terminals of the potentiometer resistor 41a and the reactor winding 40a, on the other. When the signal is zero, corresponding to a corrected or desired operation of the load, the circuit operates to maintain a predetermined saturation as set by the slider 47a and as previously described. Should the condition desired to be controlled vary, a signal voltage is produced and the firing of the SCR 30a is delayed or advanced, thereby correcting the condition to return the signal voltage to a zero value. Voltage, speed or other functions may be regulated in this manner.

In the form of the invention illustrated in FIG. 4, a balanced circuit is illustrated that largely compensates for demagnetization effects of load current.

A three phase load 10b is illustrated that is energized from three phase supply lines 61, 62 and 63. Six transformers 64, 65, 66, 67, 68 and 69 are provided that have primaries inserted in the supply leads 61, 62 and 63. Each supply lead operates with two transformers. Thus transformers 64 and 65 have primary windings 70 and 71 connected in parallel with respect to each other and together inserted in the lead 61. Primary windings 72 and 73 of the transformers 66 and 67 similarly cooperate with the lead 62. And primary windings 74 and 75 of the transformers 68 and 69 correspondingly cooperate with the lead 63.

Secondary windings 76, 77, 78, 79, 80 and 81 are respectively coupled to the primary windings 70, 71, 72, 73, 74 and 75. All of the secondary windings, except the winding 81, are serially connected across an SCR 82, and so that the voltage induced in the companion secondary windings 76–77 and 78–79, as a result of the flow of load current, cancel out. The net induced voltage in the series circuit is therefore due to the unpaired secondary winding 80.

This voltage is supplied to the SCR 82 that corresponds to the SCR 30 of the form shown in FIG. 1. The SCR 82 is provided with a similar control circuit (not shown) so that saturating current is circulated in the five transformer windings due to conduction of the SCR 82. If this control current in secondary winding 76 is opposed by the load current flowing in the primary winding 70 in producing saturation, then the current flowing in the secondary winding 77 is assisted by the load current because of opposite polarization of the primary windings 70 and 71 relative to the secondary windings 76 and 77. No matter how large or small the conduction angle of the SCR 82, at least one of the windings 70 or 71 will produce a saturation effect unopposed by load current. Since the windings 70 and 71 are in parallel, it is ensured that there is at least one low impedance path for load current whereby the control is achieved.

The same situation applies to the transformer primary windings 72 and 73, and the equivalent situation applies for windings 80 and 81. The current in the winding 80 is produced by the voltage induced in it, whereas this is not true of the windings 76, 77, 78 and 79. By appropriately choosing polarity of the windings 74 and 80, it is therefore ensured that during flow of saturating current to the SCR 82, load current assists in producing saturation. Thus a low impedance path in the lead 63 is ensured whenever the SCR 82 is on.

The secondary winding 81 and a series rectifying diode 83 together parallel the SCR 82. Thus a series circuit is provided for all of the secondary windings in which the induced voltages, if equal, precisely balance out. Should any unbalance occur, currents are circulated and the energy is redistributed. Furthermore, this circuit provides decaying, although sustained, current after the SCR 82 is shut off. The secondary winding 81 together with the windings 76, 77, 78, 79 and 80 thus serve the equivalent function as the three tertiary windings 31, 32 and 33 of the previous form.

The inventor claims:

1. In a control system for a multiple phase load: a saturable reactor for each phase, each reactor having a primary winding for connecting one phase of the load to a source terminal of a multiple phase source; a saturating winding inductively coupled to one of the primary windings; a switching device for said saturating winding; adjustable means synchronously associated with the source for closing a low impedance circuit for said saturating winding during a selected portion of the source cycle for saturating the corresponding reactor; and a balancing circuit including windings for each of the reactors and inductively coupled thereto and means forming a unidirectionally conductive low impedance closed circuit for said balancing windings, the polarity of said balancing windings being such as to produce no net voltage under balanced conditions.

2. In a control system for a multiple phase load: a saturable reactor for each phase, each reactor having a primary winding, a secondary winding, a tertiary winding and a common core; said primary windings being adapted to connect the respective phases of the load to terminals of a multiple phase source; a controllable switch; means serially and asymmetrically connecting the secondary windings together and across said switch; means synchronously associated with the source for closing the switch during a selected portion of the source cycle for saturating the reactors; a unidirectionally conductive device; and means symmetrically connecting said tertiary windings across said device for distributing energy unbalances.

3. In a control system for a multiple phase load: a pair of saturable reactors for each phase, each reactor having a primary winding, a secondary winding and a core inductively coupling the windings, the primary windings of each pair being connected in parallel and together connecting the respective phases of the load to terminals of a multiphase source; a controllable switch; means serially connecting a number of the secondary windings less than the total number of secondary windings together and across said switch; means synchronously associated with the source for closing the switch during a selected portion of the source cycle for saturating the corresponding reactors; a unidirectionally conductive device; means connecting the remainder of the secondary windings in series with said unidirectionally conductive device in a circuit paralleling said switch to form a symmetrical closed circuit for circulating currents resulting from phase unbalances; the polarity of the windings of each reactor pair being opposite.

4. In a control system for multiphase load having leads respectively for the phases and cooperable with a multiphase source: a primary winding serially connected in each lead; a core for each primary winding; a secondary coil on each core, constituting a control winding for determining the degree of saturation of the respective core; and a common control circuit for all of the secondary windings, including a controllable rectifier device in closed series circuit with said control windings, for permitting unidirectional current to flow in all the control windings, and means for adjusting the phase angle at which said rectifying device becomes active during a half cycle of said source.

5. In a control system for a multiple phase load: a saturable reactor for each phase, each reactor having a primary winding for connecting one phase of the load to a source terminal of a multiple phase source; a saturating winding inductively coupled to one of the primary windings; a switching device for said saturating winding; adjustable means synchronously associated with the source for closing a low impedance circuit for said saturating winding during a selected portion of the source cycle for saturating the corresponding reactor; a balancing circuit including windings for each of the reactors and inductively coupled thereto and means forming a unidirectionally conductive low impedance closed circuit for said balancing windings, the polarity of said balancing windings being such as to produce no net voltage under balanced conditions; and means responsive to a load condition for operating said adjustable means to vary the portion of the source cycle during which said low impedance circuit is effective.

6. In a control system for a multiple phase load: a saturable reactor for each phase, each reactor having a primary winding for serially connecting one phase of the load to a source terminal of a multiple phase source; a saturating winding inductively coupled to one of the primary windings; a controlled rectifier for completing a closed loop circuit for said saturating winding; an adjustable firing circuit for said rectifier deriving excitation by being connected across said controlled rectifier; and a balancing circuit including balancing windings for each of the reactors and inductively coupled thereto, and means connecting said balancing windings in a unidirectionally conductive closed loop.

7. In a control system for a multiple phase load: a saturable reactor for each phase, each reactor having a primary winding for serially connecting one phase of the load to a source terminal of a multiple phase source; a saturating winding inductively coupled to one of the primary windings; a controlled rectifier for completing a closed loop circuit for said saturating winding; a condenser for building a charge for firing said controlled rectifier; an adjustable unidirectionally conductive charging circuit for said condenser energized by said voltage applied to said controlled rectifier; and a balancing circuit including balancing windings for each of the reactors and inductively coupled thereto, and means connecting said balancing windings in a unidirectionally conductive closed loop.

8. In a control system for a multiple phase load: a pair of saturable reactors for each phase, each reactor having a primary winding, a secondary winding and a core inductively coupling the windings, the primary windings of each pair being connected in parallel and together connecting the respective phases of the load to terminals of a multiphase source; a controllable switch; means serially connecting all but one of the secondary windings together and across said switch; means synchronously associated with the source for closing the switch during a selected portion of the cycle for saturating the corresponding reactors; a unidirectionally conductive device; means connecting the said one of said secondary windings in series with said unidirectionally conductive device in a circuit paralleling said switch to form a symmetrical closed circuit for circulating currents resulting from phase unbalances; the polarity of the windings of each reactor pair being opposite.

9. In a control system for a multiple phase load: a pair of saturable reactors for each phase, each reactor having a primary winding, a secondary winding and a core inductively coupling the windings, the primary windings of each pair being connected in parallel and together connecting the respective phases of the load to terminals of a multiphase source; a controlled rectifier; means serially connecting all but one of the secondary windings together and across said rectifier; means synchronously associated with the source for closing the rectifier during a selected portion of the cycle for saturating the corresponding reactors; a unidirectionally conductive device; means connecting the said one of said secondary windings in series with said unidirectionally conductive device in a circuit paralleling said rectifier to form a symmetrical closed circuit for circulating currents resulting from phase unbalances; the polarity of the windings of each reactor pair being opposite; a condenser for building a charge for firing said controlled rectifier; and an adjustable unidirectionally conductive charging circuit for said condenser energized by the voltage applied to said controlled rectifier.

References Cited by the Examiner

UNITED STATES PATENTS

| 2,970,135 | 4/1957 | Bennett et al. | 323—89 |
| 2,881,856 | 4/1959 | Robinson et al. | 323—89 X |
| 3,013,199 | 12/1961 | Hollingsworth et al. | 323—89 X |
| 3,034,021 | 5/1962 | Callihan | 323—89 X |
| 3,075,139 | 1/1963 | Balteau | 323—66 |
| 3,103,619 | 9/1963 | Du Vall | 323—56 |
| 3,184,675 | 5/1965 | Macklem | 323—50 |

JOHN F. COUCH, *Primary Examiner.*

LLOYD McCOLLUM, *Examiner.*

J. M. THOMSON, W. E. RAY, *Assistant Examiners.*